United States Patent [19]

Konietzny et al.

[11] 4,379,890

[45] Apr. 12, 1983

[54] WATER-SOLUBLE POLYMERS CARRYING QUATERNARY AMMONIUM GROUPS, THEIR PREPARATION AND USE

[75] Inventors: Alfred Konietzny; Wilfried Bartz, both of Marl, Fed. Rep. of Germany

[73] Assignee: Chemische Werke Huels, Aktiengesellschaft, Marl, Fed. Rep. of Germany

[21] Appl. No.: 281,796

[22] Filed: Jul. 9, 1981

[30] Foreign Application Priority Data

Jul. 11, 1980 [DE] Fed. Rep. of Germany ....... 3026300

[51] Int. Cl.[3] ................................................ C08F 8/32
[52] U.S. Cl. ............................ 525/332.8; 106/18.32; 525/333.2
[58] Field of Search .................. 525/381, 332.8, 333.2

[56] References Cited

U.S. PATENT DOCUMENTS

| 3,661,874 | 5/1972 | Olson | 525/379 |
|---|---|---|---|
| 4,139,396 | 2/1979 | Otsuki et al. | 106/234 |
| 4,202,746 | 5/1980 | Lee et al. | 204/181 C |
| 4,233,193 | 11/1980 | Hochneuter | 525/381 |
| 4,269,626 | 5/1981 | Gorke et al. | 525/334 |

FOREIGN PATENT DOCUMENTS

| 2831785 | 1/1979 | Fed. Rep. of Germany . | |
|---|---|---|---|
| 47-29482 | 2/1971 | Japan | 525/381 |
| 2009753 | 6/1979 | United Kingdom . | |
| 1602560 | 11/1981 | United Kingdom . | |

OTHER PUBLICATIONS

Houbern-Weyl, vol. 11/2 (1958), pp. 610 & 611, vol. 14/2 (1963), p. 444.

*Primary Examiner*—Paul R. Michl
*Attorney, Agent, or Firm*—Millen & White

[57] ABSTRACT

A water-soluble polymer having quaternary ammonium groups, is prepared by reacting
 (a) a low molecular weight alkylating agent with
 (b) a corresponding polymer carrying tertiary, quaternizable amino groups.

12 Claims, No Drawings

WATER-SOLUBLE POLYMERS CARRYING QUATERNARY AMMONIUM GROUPS, THEIR PREPARATION AND USE

BACKGROUND OF THE INVENTION

The present invention relates to new water-soluble polymers containing quaternary ammonium groups useful inter alia for making aqueous agents for treating wood and wooden materials.

This application is a further development of the subject matter of U.S. application Ser. No. 073,396, filed on Sept. 7, 1979, now allowed, corresponding to German Pat. No. 2,838,930, whose disclosures are incorporated by reference herein. In these earlier inventions, aqueous media are described for treating wood and wooden materials. They contain a binder based on a 1,3-butadiene polymer. The binder is oxidatively dryable due to its olefinic double bonds, carries amino groups, and, consequently, with acids, is water-soluble or water-dispersible.

One disadvantage of these prior art treatment agents is their limited capacity for uptake of additional ingredients such as the inorganic salts and acids effective as wood preservatives. This is usually due to a limited solubility of these additives in the treatment agents or coagulation of the binder occurring at increased amounts of such additives.

SUMMARY OF THE INVENTION

Accordingly, it is an object of the present invention to provide new polymers and binders prepared therefrom, both having improved properties, e.g., for the aforementioned uses, as well as for other uses, and which minimize the foregoing disadvantages.

In another aspect, it is an object of this invention to provide a process for the production of such polymers and binders.

Upon further study of the specification and appended claims, further objects and advantages of this invention will become apparent to those skilled in the art.

These objects have been attained by this invention by providing special, water-soluble polymers carrying quaternary ammonium groups, obtained conventionally by reaction of (a) low-molecular weight alkylating agents with
(b) polymers carrying tertiary, quaternizable amino groups, wherein
(a) is a low-molecular weight oxirane and
(b) is a polymer which is obtained 1. by epoxidation of a 1,3-butadiene polymer comprising
    1.1. at least 70 mole % of a 1,3-butadiene component and
    1.2. up to 30 mole % of a component derived from other copolymerizable 1,3-diolefins and α-unsaturated monoolefins and
    1.3. which has a molecular weight ($\overline{M}_n$) of 500–6,000,
    1.4. the epoxidation being effected conventionally up to a content of titratable epoxy oxygen of 2–10 weight %, and, then,
2. by reaction of the resultant epoxidation product with
    2.1. primary-tertiary and/or secondary-tertiary diamines, optionally, in a mixture with primary and/or secondary monoamines,
    2.2. in a conventional way up to a content of 0.05–0.5 mole/100 g of the amination product, of tertiary, quaternizable amino groups, located in the side chain and linked to a carbon atom stemming either from the primary chain or from a vinyl group of the polymer via 3 ∝ 7 chain atoms, this chain being derived from the diamine component, and wherein,
3. 0.05–0.5 mole of the tertiary amino groups/100 g of the amination product are quaternized.

This invention also provides a process for producing the above-described polymers carrying quaternary ammonium groups, wherein
1. a 1,3-butadiene polymer comprising
    1.1. at least 70 mole % of 1,3-butadiene units and
    1.2. up to 30 mole % of other units of copolymerizable 1,3-diolefins and α-unsaturated monoolefins, and
    1.3. which has a molecular weight ($\overline{M}_n$) of 500–6,000,
    1.4. is epoxidized in a conventional manner up to a content of titratable epoxy oxygen of 2–10 weight %,
2. the resultant epoxidation product is reacted with
    2.1. primary-tertiary and/or secondary-tertiary diamines, optionally, in a mixture with primary and/or secondary monoamines,
    2.2. in a manner known per se up to a content of tertiary, quaternizable amino groups, located in the side chain and linked to a carbon atom stemming either from the primary chain or from a vinyl group of the polymer via 3–7 chain atoms, of 0.05–0.5 mole/100 g of the amination product, and
3. the amination product is reacted with
    3.1. low-molecular weight oxiranes
    3.2. in a manner known per se so that 0.05–0.5 mole of the tertiary amino groups/100 g of the amination product are quaternized.

Such polymers of this invention carrying quaternary ammonium groups are very useful as binders in impregnants for wood and wooden materials.

DETAILED DISCUSSION

In conjunction with the aforementioned special use, the following description employs the term "impregnant" instead of "treatment agent". The impregnation of 11od and wooden materials is understood to include all conventional treatment procedures, such as dipping, optionally under vacuum or under pressure, brushing or spraying (see DIN 68 800, sheet 3).

The basic polymers, modified in three reaction stages, epoxidation, amination, and quaternization, to produce the polymers of this invention, are homo- and copolymers of 1,3-butadiene, the former being especially preferred. Suitable comonomers include copolymerizable 1,3-diolefins, such as isoprene and 1,3-pentadiene. Also suitable as the comonomers are copolymerizable, α-unsaturated monoolefins, such as styrene. However, the 1,3-diolefins are more preferred for use in this process.

The copolymers are made up in general of at least 70 mole %, and preferably of at least 90 mole % of 1,3-butadiene, and correspondingly, maximally 30 mole %, preferably 10 mole % of the comonomers.

Preferbly, less than 40% of the olefinic double bonds are present in the trans-structure in the homo- or copolymers. Of these copolymers, especially preferred are those wherein, simultaneously, at least 40% of the olefinic double bonds are present in the cis-structure.

The molecular weight ($\overline{M}_n$), by which the basic polymer is characterized is determined by vapor pressure osomometry. This value is generally, 500–6,000, preferably 1,000–2,500.

Such basic polymers can be produced according to conventional methods as described, e.g., in German Pat. Nos. 1,186,631; 1,212,302; 1,241,119; 1,251,537; 1,292,853; 2,029,416; 2,122,956; and in DOS [German Unexamined Laid-Open Application] No. 2,361,782 the disclosures which are incorporated by reference herein. Unless specified otherwise herein, all details of these polymers are conventional, e.g., as described in these references.

The basic polymers can be employed for the subsequent reactions directly as they are obtained during manufacture. They can also previously be modified by conventional measures such as, for example, isomerization, cyclization, or partial hydrogenation. The unmodified polymers are especially preferred. For the modified polymers, care must be taken that the iodine number is at least 100, preferably at least 250 [g iodine/100 g] (DIN 53 241). This ensures a content of olefinic double bonds in the basic polymer which is sufficient for the subsequent epoxidation. An excess of olefinic double bonds over the number required during epoxidation is advantageous. In this case, the polymers obtained after the two further reaction stages and which carry quaternary ammonium groups, become capable of oxidative drying, optionally, after the addition of driers.

The epoxidation of the basic polymers is fully conventional, for example as described in German Pat. No. 2,838,930, whose disclosure is incorporated by reference herein, especially column 7, last paragraph, wherein also vinyl groups are epoxidized, in certain cases. The content of epoxy oxygen which can be titrated in the polymers (DIN 16 945) is 2–10, preferably 3–9 weight percent.

The amination of the epoxidation products also takes place conventionally, for example as disclosed in DAS [German Published Application] No. 2,732,736 and in DOS's 2,734,413 and 2,828,014, all of whose disclosures are incorporated by reference herein. The total amount of amine added to the reaction can be equimolar with respect to the epoxy group content in the epoxidized polymer. It is also possible to use excess amine and to remove the unreacted proportion of amine after the reaction. The amine can also be added in less than stoichiometric amounts, so that several of the epoxy rings remain unchanged.

The tertiary quaternizable amino groups are thus located in the side chain and are linked to a carbon atom stemming either from the primary chain or from a vinyl group of the polymer via 3–7 chain atoms. Their content in the polymers amounts to 0.05–0.5 mole/100 g, preferably 0.07–0.3 mole/100 g of amination product.

Diamines suitable for the amination are of Formula (I)

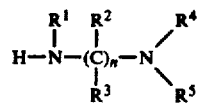

For the primary-tertiary diamines,
$R^1$ is hydrogen,
n is an integer of 2 to 6,
$R^2$ and $R^3$ each independently is hydrogen or alkyl of 1–4 carbon atoms,

represents equal or different chain members, and
$R^4$ and $R^5$ each independently is straight chain alkyl of 1–4 carbon atoms optionally substituted by a hydroxy or alkoxy of 1–4 carbon atoms, again excluding the α-position of the alkyl residue as a point of substitution. $R^4$ and $R^5$ can also form a five- or six-membered ring together with the tertiary nitrogen atom.

Suitable primary-tertiary diamines include:
N,N-dimethyl-1,3-propylenediamine, N,N-diethyl-1,3-propylenediamine, N,N-diethyl-1,4-tetramethylenediamine, 2,2,N,N-tetramethyl-1,3-propylenediamine, N,N-bis(β-hydroxyethyl)-1,3-propylenediamine, N-(3-aminopropyl)morpholine and N-(3-aminopropyl)piperidine.

N,N-Dimethyl-1,3-propylenediamine is preferred.

For the secondary-tertiary diamines,
$R^1$ is alkyl of 1 or 2 carbon atoms optionally substituted by a hydroxy or alkoxy of 1 or 2 carbon atoms, excluding the α-position of the alkyl residue, and
n and $R^2$ through $R^5$ are as defined above.

When n is two and $R^2$ and $R^3$ each is hydrogen, then $R^1$ and $R^4$ together with the two nitrogen atoms can also form a six-membered ring.

Suitable secondary-tertiary diamines include 1-methylpiperazine and 1-(β-hydroxyethyl)piperazine.

Primary monoamines suitable for amination include for example ethanolamine, propylamine, 3-ethoxy-1-propylamine, cyclohexylamine, benzylamine and aniline.

Secondary monoamines suitable for amination include, for example dimethylamine, diethanolamine, piperidine and morpholine.

When a mixture of amines is used, the composition usually is 50–100 mole % of diamines and 0–50 mole % of primary and/or secondary monoamines.

Low-molecular weight oxiranes suitable for quaternizing the amination products can be of Formula II

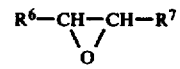

wherein $R^6$ and $R^7$ each independently is hydrogen or alkyl of 1 or 2 carbon atoms optionally substituted by hydroxy or chlorine or $R^6$ or $R^7$ together represent a 1,3-propylene or 1,4-butylene chain forming a five-or six-membered ring with the carbon atoms of the oxirane. Suitable oxiranes include ethylene oxide, propylene oxide, epichlorohydrin, glycidol, cyclopentene oxide and cyclohexene oxide. Ethylene oxide is preferrred.

The quaternization of the aminated polymers, which is known per se (see, e.g., DAS No. 2,831,785; DOS No. 2,847,600, Example 2, whose disclosures are incorporated by reference herein), can be effected in accordance with this invention with low-molecular weight oxiranes in the presence of water and an acid, such as described, for instance, in Houben-Weyl, "Methoden der organischen Chemie" [Methods of Organic Chemistry] Vol. 11/2 (1958), pp. 610 et seq., and Vol. 14/2 (1963), p. 444, which disclosures are incorporated by reference herein.

The reaction of the tertiary quaternizable amino groups (located in the side chain and linked to a carbon atom stemming either from the primary chain or from a vinyl group of the polymer via 3-7 chain members) with oxiranes in the presence of water and an acid is normally conducted so that one amino group reacts with one molecule of oxirane and acid with the formation of a tetraalkyl ammonium salt group.

The addition of water-compatible, inert organic solvents, such as lower alcohols, is normally unnecessary for the reaction. However, in certain cases, such an addition will facilitate the production of an aqueous dispersion of the amination product used in the quaternization, especially in the case of high solids contents.

The oxirane is employed in less than stoichiometric amounts for a partial quaternization of the quaternizable amino groups, and usually in a slight excess for a quantitative quaternization.

Suitable acids for the quaternization with oxiranes include inorganic or organic acids. Suitable acids include, for example:

Hf, HCl, HClO$_4$, HNO$_3$, H$_2$SO$_4$, H$_3$PO$_4$;

formic, acetic, propionic, benzoic, salicylic, oxalic, succinic, maleic, phthalic, terephthalic, lactic, tartaric, and p-toluenesulfonic acids.

Carbonic acid is preferred. Normally, this acid is used in an excess, by adjustment of CO$_2$ pressure of up to 15 bar (20° C.) prior to the beginning of the reaction.

The carbonic acid can be partically or entirely displaced from the tetraalkyl ammonium hydrogen carbonate groups present in the reaction product by simply stirring into the product a less readily volatile and normally stronger acid which is compatible and/or desirable for the specific usage of the product. Depending on the type and amount of acid added, pH values can be set in a range of 8 to 1. In this connection, it is also possible to convert those amino groups which have not been quaternized into the salt form via the acid, so that the solubility of the polymer in water is further increased.

Normally, the quaternized polymers exhibit adequate solubility or dispersing capability in water if at least 0.05 mole of the tertiary amino groups has been quaternized per 100 g of the amination product. Preferred are polymers wherein 0.07-14 0.3 mole of the tertiary amino groups have been quaternized per 100 g of the amination product.

The polymers carrying quaternary ammonium groups according to this invention are water-miscible to an unlimited extent, expecially in the pH range of 2 to 6. The addition of water-compatible, organic solvents, such as lower alcohols, is usually unnecessary.

The polymers of this invention are valuable for a variety of uses. They are especially suitable as binders in aqueous impregnants for wood and wooden materials.

For use as impregnants, the pH value of the aqueous solution or dispersion is preferably set at 2 to 6. For this purpose, those acids are preferably employed which exhibit biocidal activity, such as hydrofluoric, phosphoric, phosphorous, arsenic, benzoic, or salicylic acid, or acids which form complexes with metal ions, such as tartaric acid or ethylenediaminetetraacetic acid.

To prepare the impregnants of this invention, the thus-produced aqueous solution or dispersion of the binder is combined with conventional wood preservatives, and, optionally, with other conventional additives, such as pigments, antiskinning agents, driers, and surfactants.

Suitable wood preservatives primarily include water-soluble, biocidally effective, inorganic salts and acids, e.g., alkali fluorides, alkali arsenates, silicofluorides, hydrogen fluorides, boron compounds (boric acid, borates), and salts of lead, tin, cadmium, nickel, cobalt, manganese, copper, mercury, chromium, and zinc. Also, organic wood preservatives can be added, such as pentachlorophenol, for example. In case of an inadequate solubility of such preservatives, it is possible to add organic, water-compatible solvents, such as lower alcohols and ketones.

Additives of the aforedescribed type are contained in the impregnants in quantities which are fully customary in practice. The types and amounts of such additives are always dependent on the particular material to be treated, its use, and on the impregnating method employed, and can be readily determined by a few preliminary and routine orientation experiments.

The impregnants of this invention generally have a binder content of 1-30, preferably 5-15 weight percent, and can be applied according to any conventional method of the prior art (see, e.g., DIN 68 800, sheet 3). The protective action attained in a particular case is closely linked to the nature of the treatment method as is well known to persons skilled in the art. The impregnants of this invention have a higher compatibility with and dissolving capacity for additives such as inorganic salts and acids than do conventional impregnants, e.g., based on binders not having quaternized amino groups.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated. Parts refer to weight parts, and percent refers to weight percent, unless indicated otherwise.

Two commercial polybutadienes are employed in the examples for the manufacturing process.

TABLE 1

| Properties of the Polybutadienes | 1 | 2 |
|---|---|---|
| $\overline{M}_n$ (determined by vapor pressure osmometry in chlorobenzene) | about 1,700 | about 1,000 |
| Iodine number (DIN 53 241), g iodine/100 g | 445 | 400 |
| Viscosity (DIN 53 214, 20° C.) Pa.s | 0.8 | 7.5 |

TABLE 1-continued

| Properties of the Polybutadienes | | |
|---|---|---|
| | 1 | 2 |
| Double bond distribution, determined by IR spectrometry, 1,4-cis/1,4-trans/vinyl | 73/25/2 | 0/13/87 |

Epoxidation

Polybutadienes 1 and 2 are conventionally epoxidized with 60% $H_2O_2$ in the presence of formic acid (German Pat. No. 2,838,930, Column 7, last paragraph) to form products 3 and 4.

TABLE 2

| Properties of the Epoxidized Polybutadienes | | |
|---|---|---|
| | 3 | 4 |
| Total oxygen (elementary analysis), % | 9.4 | 7.6 |
| Epoxy oxygen which can be titrated (DIN 16 945), % | 7.3 | 5.6 |
| Viscosity (DIN 53 214, 20° C.), Pa.s | 11 | 160 |

Amination

Products 3 and 4 are aminated to products 5 and 6 as follows.

5: 89.7 parts of product 3, 8.2 parts of N,N-dimethyl-1,3-propylenediamine, and 2.1 parts of diethanolamine are heated under nitrogen for 8 hours to 180° C. under agitation. A highly viscous, pale-yellow product is thus obtained wherein the amines are quantitatively added.

Epoxy oxygen which can be titrated (DIN 16 945): 4.25%; amino nitrogen (sample diluted with tetrahydrofuran, acidified with aqueous HCl, and titrated potentiometrically with n/10 methanolic KOH): 0.18 mol total amino nitrogen/100 g, ≙ 0.08 mol of quaternizable, tertiary amino groups/100 g.

6: 84.7 parts of product 4 and 15.3 parts of N,N-dimethyl-1,3-propylenediamine are heated as in (5) for respectively 1 hour at 170°, 180°, and 190° C. Any unreacted amine is driven off at 190° C. during 1 hour under a vigorous nitrogen stream. A highly viscous, pale-yellow product is obtained.

Epoxy oxygen which can be titrated (DIN 16 945): 1.95% amino nitrogen (determined as in [5]): 0.27 mol total amino nitrogen/100 g, ≙ 0.13 mol of quaternizable, tertiary amino groups/100 g.

Quaternization

Products 5 and 6 are quaternized to products 7-9 as follows:

7: 28.8 parts of product 5 is agitated at 20° C. with 68.4 parts of 0.4-normal aqueous hydrochloric acid corresponding to a degree of neutralization of about 53%, until a homogeneous mixture is obtained. At this temperature, 2.8 parts of propylene oxide is introduced under stirring, and the mixture is heated for 1 hour to 70° C. A creamy reaction mixture is thus obtained which exhibits the following properties:

Dry residue (2 hours at 120° C.): 31.5 g per 100 g of reaction mixture.

Amino nitrogen (determined as in [5]): 0.027 mol per 100 g of reaction mixture. The reaction mixture can be diluted with water to a clear, colorless solution.

8: 24.5 parts of product 5 is agitated in a glass beaker together with 65 parts of $CO_2$-saturated water at 15° C., wherein a $CO_2$ excess is constantly maintained by the addition of dry ice. After about 1 hour, a low-viscous, milky, homogeneous liquid is obtained; a solution of 2.1 parts of ethylene oxide in 8.4 parts of water is introduced into this liquid under agitation. The resultant mixture is introduced into a steel autoclave; $CO_2$ is fed into the autoclave up to a pressure of 10 bar, and the reaction mixture is heated for 3 hours to 80° C., thus obtaining a pressure of about 20 bar. After cooling and expansion, a pale-yellow, slightly turbid solution is obtained having the following properties:

Viscosity (DIN 53 214, 20° C.): 40 mPa·s.

Dry residue (2 hours at 120° C.): 26 g per 100 g of reaction product.

Amino nitrogen (determined as in [5]): 0.026 mol per 100 g of reaction product.

9: 21.2 parts of product 6 is diluted at 80° C. with 5.3 parts of isopropanol. After cooling to 20° C., 60 parts of $CO_2$-saturated water is added under agitation in incremental portions, there always being maintained an excess of $CO_2$ by adding dry ice. After about 2 hours, a creamy, fluid, homogeneous mixture is obtained into which is stirred a solution of 2.8 parts of ethylene oxide in 10.7 parts of water. The resultant mixture is introduced into a steel autoclave, $CO_2$ is forced into the latter up to a pressure of 10 bar, and the reaction mixture is heated for 3 hours to 80° C. A yellowish-clear solution is thus obtained with the following properties:

Viscosity (DIN 53 214, 20° C.): 175 mPa·s.

Dry residue (2 hours at 120° C.): 22.5 g per 100 g of reaction product.

Amino nitrogen (determined as in [5]): 0.029 mol per 100 g of reaction product.

In order to determine whether the quaternization products lie within the limits according to this invention, the following procedure can be adopted:

(1) The total reaction product is determined (in parts), optionally after the addition of an adequate amount of a homogenizing, water-compatible, organic solvent, to which correspond the respectively employed amination product (in parts) and the known *amino nitrogen (in moles) prior to quaternization.*

(2) By potentiometric titration of an aliquot sample, the *amino nitrogen (in moles) after quaternization* is determined, as described above, and this value is related to the total reaction batch.

(3) By subtraction and relation to the utilized amination product, the tertiary amino groups which have been quaternized are determined, in mol/100 g amination product.

Production of the Impregnants

According to the invention: I through III; for comparison: A and B.

I: 37.7 parts of reaction product 8 (≙ 9.8 parts of dry residue) is combined in incremental portions with a solution of 2.1 parts of $KHF_2$ (technical quality, acid content determined by acidimetry: 1.37 mol/100 g) in 60.2 parts of water under agitation, thus liberating $CO_2$ under frothing. A slightly turbid, pale-yellow solution is obtained having a water-like viscosity.

Binder content: about 10% pH Value: 5.3

II: Analogously to (I), a clear, pale-yellow solution is obtained from 37.7 parts of reaction product 8 and a solution of 1.6 parts of 87% aqueous $H_3PO_4$ in 60.7 parts of water.

pH Value: 2.7

III: Analogously as in (I), a solution having a similar appearance as (II) is obtained from 40.0 parts of reaction product 9 (≙ 9.0 parts of dry residue) and a solution of 2.6 parts of KHF₂ (technical grade) in 57.4 parts of water.

pH Value: 5.7

A: 10.6 parts of product 5, 3.1 parts of KHF₂ (technical grade), and 86.3 parts of water are stirred together. A clear, yellowish solution is obtained having a water-like viscosity.

pH Value: 5.3

B: A solution having a similar appearance as in (A) is obtained from 10.7 parts of product 5, 2.4 parts of 87% aqueous H₃PO₄, and 87 parts of water.

pH Value: 3.8

Dissolving Capacity of the Impregnants for Inorganic Salts and Acids

The additives listed in the following Table 3 (in g at 20° C.) are stirred in incremental portions into respectively 100 g of the impregnant, until the solubility limit has been reached (in case of H₃BO₃, the solubility of which is 5.1 g/100 g of water); until the polymeric binder coagulates; or until the adding step is discontinued (characterized by *).

TABLE 3

| Dissolving Capacity of the Impregnants for Inorganic Salts and Acids | | | | | |
|---|---|---|---|---|---|
| | I | II | III | A | B |
| H₃BO₃ | 7.3 | 5.6 | 14 | 1.9 | 5.3 |
| KHF₂ (technical grade) | 10.2 | 6.4 | 11.2 | 5.2 | 5.2 |
| CuSO₄.5 H₂O | >38* | 15.8 | >30* | 3.6 | 1.1 |

Table 3 demonstrates that the dissolving capacity of the impregnants, produced with the binders of this invention, for inorganic salts and acids has been markedly improved in a way which could not be foreseen, as compared with the impregnants prepared with the binders not according to this invention.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A water-soluble polymer having quaternary ammonium groups, prepared by reacting
   (a) a low molecular weight alkylating agent with
   (b) a corresponding polymer carrying tertiary, quaternizable amino groups, wherein (a) is a low molecular weight oxirane of the formula

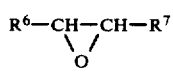

wherein R⁶ and R⁷ each independently is hydrogen or alkyl of 1 or 2 carbon atoms optionally substituted by hydroxy or chloride or R⁶ or R⁷ together represent a 1,3-propylene or 1,4-butylene chain forming a five- or six-membered ring with the carbon atoms of the oxirane;

(b) is a polymer which is prepared by epoxidizing up to a content of titratable epoxy oxygen of 2–10 weight %, a polymer of 1,3 butadiene monomer having a molecular weight ($\overline{M}_n$) of 500–6,000, and prepared from at least 70 mole % of 1,3-butadiene and up to 30 mole % of another copolymerizable 1,3-diolefin or an α-unsaturated monoolefin, aminating the resultant epoxidation product with a primary-tertiary or secondary-tertiary diamine of the formula

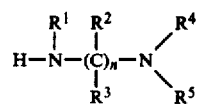

wherein,

R¹ is hydrogen and n is an integer of 2 to 6,

R² and R³ each independently is hydrogen of alkyl of 1–4 carbon atoms,

represents the same or different chain members, and

R⁴ and R⁵ each independently is straight chain alkyl of 1–4 carbon atoms optionally substituted by hydroxy or alkoxy of 1–4 carbon atoms, excluding the α-position of the alkyl residue as a point of substitution, or R⁴ and R⁵ together can form a five- or six-membered ring together with the tertiary nitrogen atom; or R¹ is alkyl of 1 or 2 carbon atoms, optionally substituted by hydroxy or alkoxy of 1 or 2 carbon atoms, excluding the α-position of the alkyl residue, n and R² through R⁵ are as defined above, and when n is 2 and R² and R³ each is hydrogen, then R¹ and R⁴ together with the two nitrogen atoms can also form a six-membered ring, up to a content of tertiary, quaternizable amino groups of 0.05–0.5 mole/100 g of the amination product, said groups being located in the side chain and linked to a carbon atom stemming either from the primary chain or from a vinyl group of the polymer via 3–7 chain atoms, and in the quaternization reaction, 0.05–0.5 mole of the tertiary amino groups/100 g of the amination product are quaternized.

2. A polymer of claim 1 wherein the polymer of 1,3 butadiene monomer is a homopolymer.

3. A polymer of claim 1 wherein the polymer of 1,3 butadiene monomer is prepared from at least 90 mole % of 1,3-butadiene, the molecular weight $\overline{M}_n$ is 1,000–2,500, less than 40% of its double bonds are trans-double bonds, and the iodine number is at least 100 g iodine/100 g.

4. A polymer of claim 1 wherein the polymer of 1,3 butadiene monomer is prepared from at least 90 mole % of 1,3-butadiene, the molecular weigt $\overline{M}_n$ is 1,000–2,500, at least 40% of its double bonds are cis-double bonds, and the iodine number is at least 100 g iodine/100 g.

5. A polymer of claim 1 wherein the epoxidation is carried out up to a content of 3–9 weight % of titratable epoxy oxygen in the polymer.

6. A polymer of claim 1 wherein the amination produces a product having 0.07–0.3 mole/100 g of quaternizable amino groups.

7. A polymer of claim 1 wherein the diamine is N,N-dimethyl-1,3-propylenediamine.

8. A polymer of claim 1 wherein, in addition to the diamines, the amination is conducted in the presence of a primary or secondary monoamine.

9. A polymer of claim 1 wherein the oxirane is ethylene oxide.

10. A polymer of claim 1 wherein 0.07–0.3 mole/100 g of polymer of the quaternizable amino groups has been quaternized in the quaternization step.

11. A polymer of claim 1 wherein the quaternization is conducted in the presence of carbonic acid.

12. In an aqueous impregnant for wood and wooden materials comprising water and a binder, the improvement wherein the binder is a polymer of claim 1.

* * * * *